Feb. 9, 1932.  K. TESSKY  1,844,191

SCREW CUTTING APPLIANCE FOR LATHES

Filed Dec. 10, 1930

Inventor:
Karl Tessky
by Karl Kuhalt
Atty.

Patented Feb. 9, 1932

1,844,191

UNITED STATES PATENT OFFICE

KARL TESSKY, OF ESSLINGEN-ON-THE-NECKAR, GERMANY

SCREW-CUTTING APPLIANCE FOR LATHES

Application filed December 10, 1930, Serial No. 501,369, and in Germany December 20, 1929.

My invention relates to screw-cutting appliance for lathes.

It has already been proposed to provide lathes with so-called overtaking screw-cutting appliances, in which, if right-hand threads are cut and the spindle rotates to the left, the holder for the threading tool rotates in the same direction, but at higher speed than the work so that the excess of velocity is the resultant cutting velocity of the threading tool. When it is desired to unscrew the threading tool, the tool holder is braked or arrested altogether.

Such overtaking screw cutting appliances were heretofore adapted to single-spindle lathes of a special kind, for instance, automatic screw machines for manufacturing simple screws, fashioned parts and the like in which normally only the threading tool is moved in axial direction. In such machines the threading-tool holder was connected directly to a suitable driving mechanism and arranged in a fixed position with respect to the spindle.

The drive of the overtaking screw cutting appliance did not present any difficulties in multi-spindle lathes in which the appliance was mounted on a reciprocating tool carriage. However, the advantages of cutting threads by an overtaking appliance could not be utilized in machines in which the tools were supported by a turret head.

It is old to rotate a tool which is mounted on a turret head, for instance a drill. However the means provided for this purpose, could not be used directly for driving an overtaking screw-cutting tool and for operating a clutch for unscrewing the threading tool from the leading tool holder when the desired length of thread had been cut. Therefore in machines having turret heads it was necessary to vary the connections of the spindle and to provide two directions of rotation and two speeds for the spindle, one for threading and one for unscrewing.

According to my invention I am enabled to operate with an overtaking threading tool on turret lathes by effecting an alternating drive for the threading-tool holder through the shaft of the turret head which causes the holder to be operated at a faster rate for threading and at a slower rate for unscrewing, or to be arrested altogether.

In the drawings affixed to this specification and forming part thereof a turret lathe with the new appliance adapted to it is illustrated diagrammatically by way of example.

Figure 1:
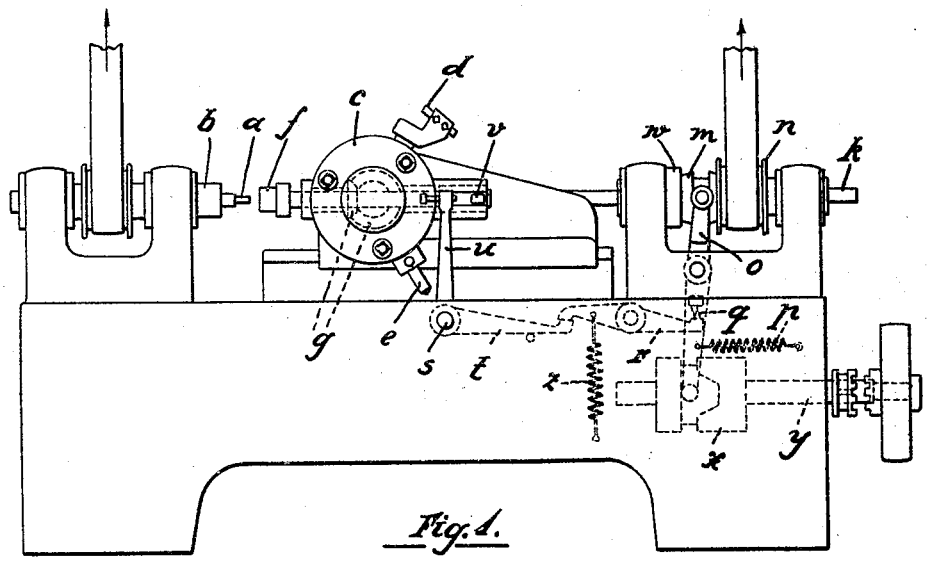
Fig. 1 is an elevation showing a portion of the lathe.
Figure 2:
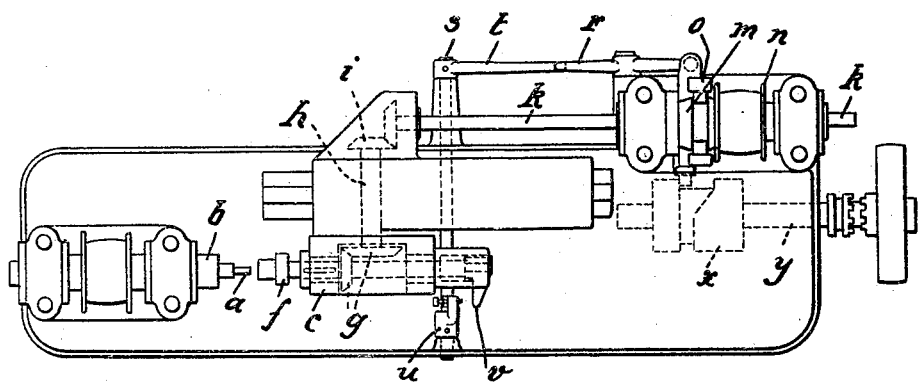
Fig. 2 is a plan view.

Referring now to the drawings, $a$ is the work which is rotated by the spindle $b$, $c$ is a turret head with tools $d$, $e$, $f$ being a holder for a threading tool which is mounted to rotate and to be displaced axially in the turret head $c$ and is rotated from a shaft $h$ which is coaxial with the shaft about which the turret head is rotated, through the medium of a bevel gearing $g$. $i$ is a bevel gearing at the opposite end of the shaft $h$ which is rotated from the clutch shaft $k$.

$m$ is a clutching member having two tapers and being splined on the shaft $k$. In the position illustrated in Fig. 1, the taper at the right of the clutching member $m$ is engaged with a loose pulley on the shaft $k$ and is held in this position by a double-armed clutch lever $o$, which is retained against the action of a pull-back spring $p$ by a tooth $q$ on a catch $r$ which is equipped with a pull-back spring $z$. $t$ is an arm which is secured on a shaft $s$ and cooperates with the catch $r$, $u$ is another arm, also on the shaft $s$, which is arranged to be engaged by a lug $v$ at the rear end of the holder $f$. The holder $f$ is mounted to be displaced on the turret head, but held against rotation. When the thread has been cut to nearly the desired length, the lug $v$ strikes the arm $u$, rotating the shaft $s$ and operating arm $t$ and catch $r$ until the tooth $q$ of the catch $r$ releases the clutching lever $o$ which is then thrown over by the spring $p$. The taper at the right of member $m$ which had been engaged with the pulley $n$ is now disengaged from the pulley and at the same time the taper at the left engages in a hollow tapering sleeve $w$ which may be fixed as shown, or mounted to rotate slowly. By these means the member $m$, the shaft $k$ and the holder $f$ are braked or arrested so that the work $a$ is unscrewed from the threading tool which has ceased rotating or rotates slowly and is only receding.

$x$ is a cam on a shaft $y$ which serves for returning the clutching lever $o$ to its initial position, Fig. 1, so that the pulley $n$ is again connected to the shaft $k$ by the member $m$. By adapting an overtaking appliance to turret lathes, the advantage of overtaking is obtained in the machining of blanks which require several tools in the turret head. The advantage of overtaking is that the spindle which rotates in the same direction, also during threading, permits other turning and cutting-off operations to be performed during the threading operation. Another advantage is the elimination of the changing of the connections of the spindle, with the long rod, which was heretofore required by changing from left-handed to right-handed threads, and vice versa, and the power expenditure for reversing the moving parts, as heretofore required in turret lathes.

The particular arrangement and design of the tool holder $f$ and the turret head $c$ permits exact cutting out of the threading tool when the desired length of thread has been cut, without any interference on the part of the other tools in the turret, and independently from the period at which the tool started to cut the thread, which may be somewhat sooner or somewhat later. Differential slip of the belts operating the spindle $b$ and the clutch $m$, $n$ on the shaft $r$ does not interfere with the exactitude of the thread length.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A lathe having a single spindle and a turret head mounted to rotate about an axis at right angles to said spindle, a die spindle mounted to slide in said turret head, a driving shaft extending through said turret head and adapted to operate said spindle, a change-speed device for said driving shaft arranged outside said turret head, means for controlling said speed-varying means, and means operatively connected to said die spindle for operating said change-speed device.

2. A lathe having a single spindle and a turret head mounted to rotate about an axis at right angles to said spindle, a die spindle mounted to slide in said turret head, a driving shaft extending through said turret head and adapted to operate said spindle, a change-speed device for said driving shaft arranged outside said turret head, means for controlling said speed-varying means, and a dog on said die spindle for operating said change-speed device.

3. A lathe having a single spindle and a turret head mounted to rotate about an axis at right angles to said spindle, a die spindle mounted to slide in said turret head, a driving shaft extending through said turret head and adapted to operate said spindle, a change-speed device for said driving shaft, a dog on said die spindle, and a counter stop in the way of said dog outside said turret head for operating said change-speed device.

In testimony whereof I affix my signature.

KARL TESSKY.